United States Patent [19]

Hauser

[11] 4,449,424
[45] May 22, 1984

[54] MULTI-SPEED TRANSAXLE

[75] Inventor: Hans Hauser, Chippewa Lake, Ohio

[73] Assignee: MTD Products Inc., Cleveland, Ohio

[21] Appl. No.: 316,564

[22] Filed: Oct. 30, 1981

[51] Int. Cl.³ .................... F16H 37/08; F16H 57/02
[52] U.S. Cl. ................................ 74/701; 74/606 R;
74/421 R
[58] Field of Search ............... 74/700, 701, 606 R,
74/421 R, 421 A

[56] References Cited

U.S. PATENT DOCUMENTS

| 1,362,490 | 12/1920 | Keck | 74/701 |
| 2,867,135 | 1/1959 | Schiller | 74/701 |
| 3,095,758 | 7/1963 | Bixby | 74/701 |
| 3,447,399 | 6/1969 | Hungerford | 74/701 |
| 4,223,567 | 9/1980 | Onda | 74/606 R |

FOREIGN PATENT DOCUMENTS

| 1279485 | 10/1968 | Fed. Rep. of Germany | 74/701 |
| 594188 | 9/1925 | France | 74/606 R |
| 1330220 | 3/1962 | France | 74/606 R |

Primary Examiner—Allan D. Herrmann
Assistant Examiner—D. Wright
Attorney, Agent, or Firm—Woodling, Krost & Rust

[57] ABSTRACT

A multi-speed transaxle is disclosed having a two speed (32, 35) balanced gearing between an output shaft (12) and a differential (14), one end of the balanced gearing (32) bearing on a rotating shaft (11) of the transmission.

8 Claims, 3 Drawing Figures

MULTI-SPEED TRANSAXLE

FIELD TO WHICH INVENTION RELATES

My invention relates to the bearing support of a balanced gearing in a transmission. It is especially suitable for use in a transmission in which all bearings are located in a single plane, a plane coextensive with a plane of separation of the transmission.

STATEMENT OF THE INVENTION

It is an object of this invention to reduce the cost of a multi-speed transmission.

It is an object of this invention to facilitate the manufacture of a multi-speed transmission.

It is an object of this invention to increase the strength of a multi-speed transmission.

It is an object of this invention to increase the reliability of a multi-speed transmission.

It is an object of this invention to provide a balanced multi-speed gearing in a transmission.

Other advantages and a fuller understanding of the invention may be had by referring to the following description and claims, taken in conjunction with the accompanying drawings, in which:

FIGURES OF THE DRAWINGS

DESCRIPTION OF THE INVENTION HEREIN DISCLOSED

Figure 1:
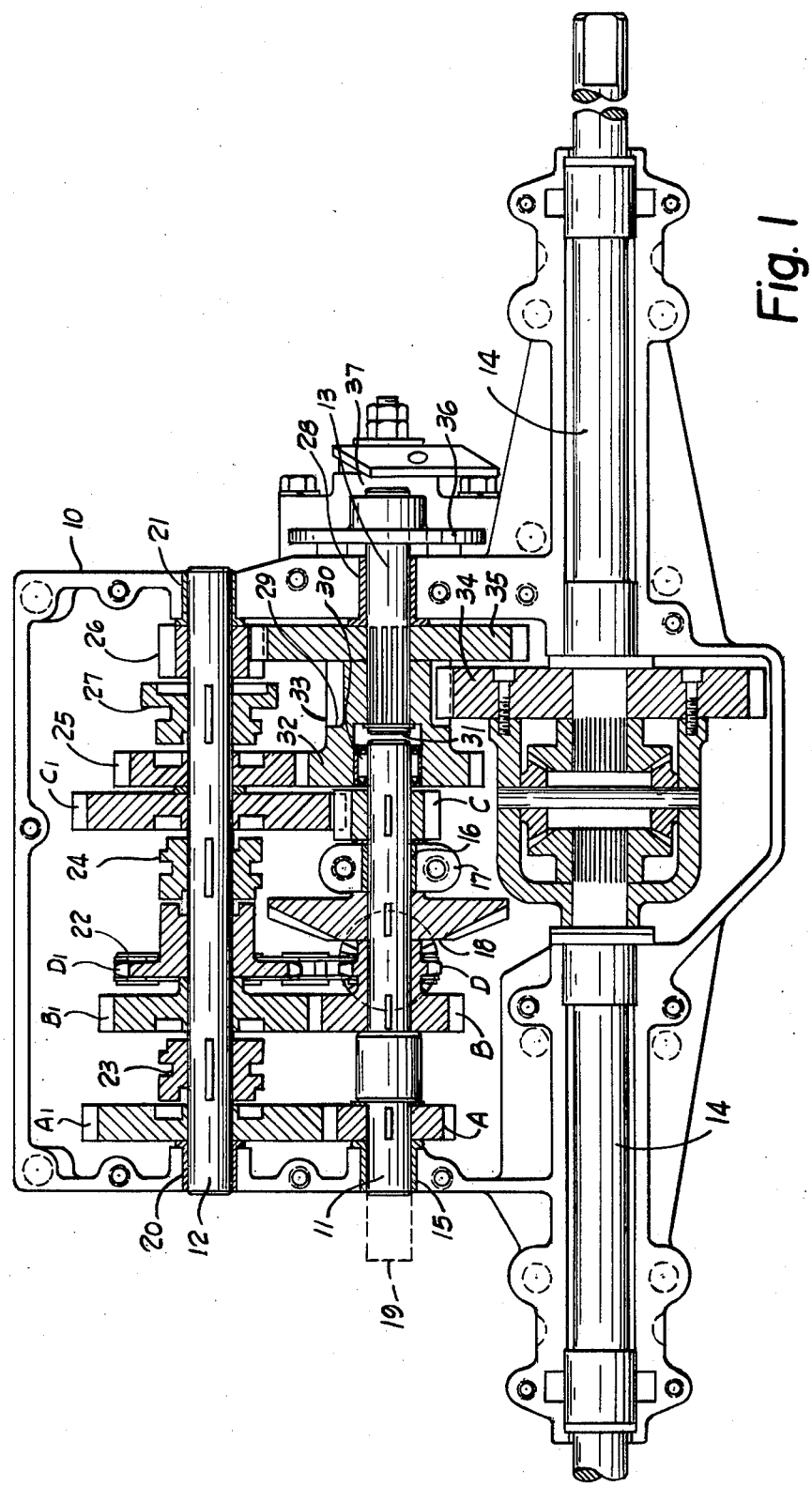
FIG. 1 is a cut-away cross section of a multi-speed transmission incorporating the invention of this application.
Figure 2:
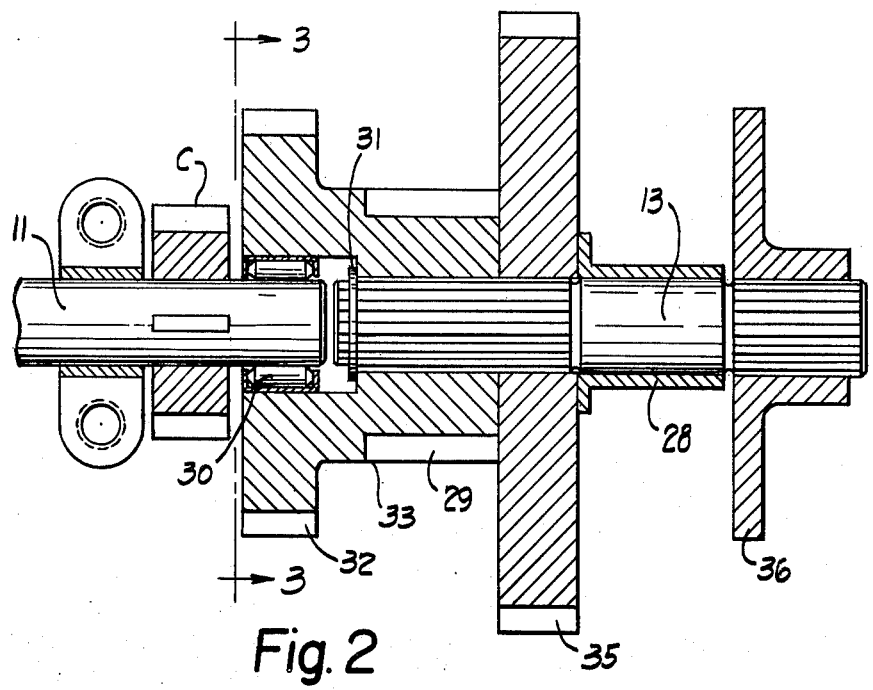
FIG. 2 is an enlarged fragmentary view detailing the multi-speed gearing of FIG. 1.
Figure 3:
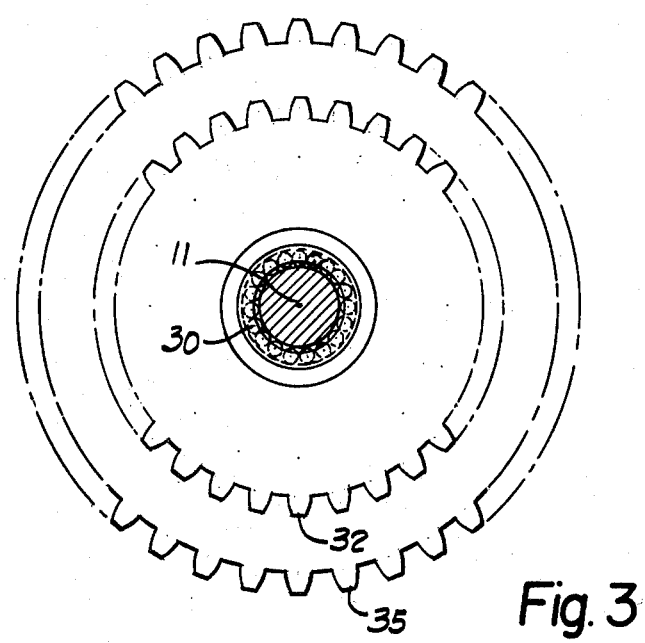
FIG. 3 is a cut-away end view of the multi-speed gearing of FIG. 2 taken generally from lines 3—3 of that figure.

The multi-speed transmission incorporating the invention of this application has a housing 10, a driven shaft 11, an output shaft 12, a jack or brake shaft 13 and a differential axle shaft 14. As seen in the drawing, this housing 10 has opposed end walls which carry the shafts 11, 12, 13 and 14 extending therebetween. The housing 10 also has opposing side walls generally parallel to said shafts and which join the said end walls so as to enclose the housing interior. See FIG. 1. In the embodiment disclosed the driven shaft 11, output shaft 12, jack shaft 13 and differential axle shaft 14 are in a single plane, a plane corresponding with the central seam (not shown) between the top portion (not shown) and the bottom portion of the housing 10. The shafts 11, 12 and 14 could be oriented differently. The driven shaft 11 is generally between the output shaft 12 and the differential axle shaft 14. The output shaft 12 is longer than the driven shaft 11.

The driven shaft 11 is rotationally supported at one end by a sleeve bearing 15 to the housing 10 and a spaced distance from the other end by a sleeve bearing 16 to a central support 17. The central support 17 is part of the housing 10.

Power is fed to the driven shaft 11 through a pinion-bevel gear 18 combination or by an extension 19 (shown in dotted line) of one end of the driven shaft 11.

The driven shaft 11 has a number of different sized forward gears A, B and C and a reversing chain sprocket D on it.

The output shaft 12 is rotationally supported at both ends by sleeve bearings 20, 21 to the housing 10.

The output shaft 12 has a number of different sized foward gears $A_1$, $B_1$ and $C_1$ and a reversing chain sprocket $D_1$ journaled on it. The gears intermesh with the corresponding gears A, B and C on the input shaft 11. There is a chain 22 connecting the reversing chain sprockets D, $D_1$.

There are axially sliding dog clutches 23, 24 on the output shaft 12. These dog clutches 23, 24 selectively drivingly interconnect the corresponding gear $A_1$, $B_1$ or $C_1$ or the reversing chain sprocket $D_1$ to the output shaft 12. Although these dog clutches are shown on the output shaft 12 by suitable alterations known to those skilled in the art, the dog clutches could be located on the driven shaft 11 or on a combination of shafts. These dog clutches 23, 24 are operated by a shift lever (not shown).

In addition there are two other gears 25 and 26 journaled on the output shaft 12. These other gears 25 and 26 are of different diameters. There is a dog clutch 27 between these gears 25 and 26 to selectively drivedly interconnect these two other gears 25, 26 to the output shaft 12. The dog clutch 27 is operated by its own shift lever (not shown).

The jack or brake shaft 13 is rotationally supported a spaced distance from one end by a sleeve bearing 28 to the housing 10. A gear 29 is fixedly attached to the other end of the jack shaft 13. The gear 29 is rotationally carried by the other end of the driven shaft 11 by needle bearing unit 30 disposed on the driven shaft 11. Jack shaft 13 is aligned with the driven shaft 11. A snap ring 31 prevents disattachement of the jack shaft 13 from the gear 29.

The gear 29 has two portions 32 and 33. These portions 32 and 33 are of differing diameter. One portion 32 has its teeth generally surrounding the needle bearing 30. This portion 32 has its teeth drivedly intermeshed with gear 25 of the other gears journaled on the output shaft 12. The other portion 33 of gear 29 generally surrounds the jack shaft 13 where gear 29 is splined to the driven shaft 11. The teeth of other portion 33 of gear 29 drivedly intermeshes with the input gear 34 of the differential axle shaft 14.

There is another gear 35 fixedly attached to the jack shaft adjacent to the other portion 33 of gear 29. The gear 35 has a different diameter than the portions 32 and 33 of gear 29. This gear 35 drivedly intermeshes with gear 26 of the other gears journaled on the output shaft 12.

A brake disc 36 is attached to the end of the jack shaft that extends out of the housing 10 beyond sleeve bearing 28. A brake operating mechanism 37 is attached to the housing 10. This provides for selective braking of the jack shaft 13 and the vehicle to which the transaxle is attached.

In the embodiment shown, all bearing areas are located in one plane. This plane is coextensive with the plane of separation between the top portion (not shown) and the bottom portion of the housing 10. Because the invention of this application increases the tolerance of the most critical alignment, that of bearings 15, 16 and 28 (see FIG. 1), all bearing supports can be cast dimensionally to size. There is no need of critically aligned machining of the bearing supports. The bearings can instead be quickly and easily inserted into the bearings supports of the housing 10 as cast. This facilitates the manufacture and lowers the cost of transmissions.

By having jack shaft 13 separate and distinct from the driven shaft 11 and by having an end of the jack shaft 13 bearing on an end of the driven shaft 11, the transmission can be made more compact. The amount of metal needed to form the housing is reduced. The separateness and bearing 30 also reduce the criticalness of the alignment of sleeve bearings 15, 16 and 28. The separateness and bearing 30 increase the tolerances such that less machining of the housing is necessary. The assembly of the transmission is facilitated. The brake mechanism is simplified. The separateness and bearing 30 reduce the cost of the idler gears 29 and 35 by allowing such gears to be shaped for easy pressing of powdered metal. The gears 29 and 35 do not have to be made as a complex single unit. The separateness and bearing 30 increase the flexibility of the transmission by allowing an easy transformation of the transmission into a three speed unit. This is accomplished by omitting gears 26 and 35 and dog clutch 27 and by permanently affixing gear 25 to the intermediate shaft 12.

Although this invention has been described in its preferred form with a certain degree of particularity, it is to be understood that numerous changes may be made without departing from the invention as hereinafter claimed.

What is claimed is:

1. In a transmission having a housing for containing gears and a pair of axially aligned shafts carrying the gears, the housing having side walls and a connecting wall, the shafts having facing ends separated from each other, the improvement of a supporting member carried by a side wall of the housing a distance from the end walls of the housing, said supporting member supporting one of the shafts of said aligned shafts at a location spaced from the end of said shaft, the end of said shaft supported by the supporting member protruding from said supporting member, a gear having a centrally disposed hole carried on the end of one of the shafts of said aligned shafts, said gear being non rotatably carried by the other shaft of said aligned shafts, the said protruding end of the shaft supported by the supporting member extending into the centrally disposed hole of said gear, the arrangement providing for the bearing support of said non-supported shaft by said supporting member through dependence on the supported shaft while permitting the shafts to rotate independently of each other.

2. The structure of claim 1 characterized by a separate bearing interposed between said gear and the end of the other shaft not supported by said supporting member.

3. In a transmission having a housing for containing gears and first and second axially aligned shafts carrying the gears, the housing having side walls and a connecting wall, the shafts having facing ends separated from each other for permitting rotation of the shafts independently of each other, the improvement of a supporting member carried by a side wall of the housing a distance from the end walls of the housing, said supporting member supporting the first shaft a spaced distance from the end of said first shaft, the end of said first shaft protruding from said supporting member toward the second shaft, a gear non-rotatably carried on the end of the second shaft for rotation therewith, said gear having a central hole therein accommodating in the hole the protruding end of the first shaft, said gear rotatably journaled on the end of the first shaft for rotation therearound and providing for the bearing support of the end of the second shaft by the supporting member through the first shaft while permitting the shafts to rotate independently of each other.

4. The structure of claim 3 characterized by a separate bearing within said central hole interposed between said gear and the end of the protruding end of the first shaft.

5. The structure of claim 4 wherein said gear has a recess in the fact thereof, the recess being in axial alignment with said shafts and having an inner wall, and wherein the protruding end portion of the first shaft and the bearing about said protruding end protrude into said recess with the bearing member in engagement with the inner wall of the recess.

6. In a transmission having a housing for containing gears and first and second axially aligned shafts carrying the gears, the housing having end walls and side walls, the shafts having facing ends separated from each other for permitting rotation of the shafts independently of each other, the improvement of a supporting member carried by a side wall of the housing a distance from the end walls of the housing, said supporting member supporting the first shaft a spaced distance from the end of said first shaft, the end of said first shaft protruding from said supporting member toward the end of the second shaft, a gear, said gear having two portions, said two portions of said gear having differing diameters, said gear being non-rotatably connected to the end of the second shaft for rotation therewith by one portion of said gear, the other portion of said gear extending beyond the end of the second shaft, said other portion of said gear having a central recess in the face thereof, said recess being in axial alignment with said shafts and having an inner wall and the end portion of the first shaft protruding into said recess in rotational operative inter-engagement with the inner wall of the recess, the arrangement providing for the bearing support of the end of the second shaft by the supporting member by dependence on the first shaft while permitting the shafts to rotate independently of each other.

7. The structure of claim 6 characterized by the addition of another gear, a third shaft and a differential, said other gear having a diameter different from said two portions of said gear, said other gear being non-rotatably connected to the second shaft next to said one portion of said gear, said one portion of said gear drivingly connected to the differential and means to selectively drivingly connect the other portion of said gear or said other gear to the third shaft, said arrangement providing for a two speed balanced connection between the third shaft and the differential.

8. The structure of claim 6 characterized by the addition of a bearing and said bearing being in said recess between said inner wall of said recess and the end portion of the first shaft.

* * * * *